United States Patent
Fraize et al.

(10) Patent No.: US 9,154,461 B2
(45) Date of Patent: Oct. 6, 2015

(54) PACKET CAPTURE DEEP PACKET INSPECTION SENSOR

(71) Applicant: THE KEYW CORPORATION, Hanover, MD (US)

(72) Inventors: John Fraize, Northborough, MA (US); Darrell Covell, Columbia, MD (US); Thomas Williams, Columbia, MD (US); Stephanie Tomanek, Columbia, MD (US)

(73) Assignee: THE KEYW CORPORATION, Hanover, MD (US)

( * ) Notice: Subject to any disclaimer, the term of this patent is extended or adjusted under 35 U.S.C. 154(b) by 126 days.

(21) Appl. No.: 13/895,666

(22) Filed: May 16, 2013

(65) Prior Publication Data

US 2013/0308448 A1  Nov. 21, 2013

Related U.S. Application Data

(60) Provisional application No. 61/647,689, filed on May 16, 2012.

(51) Int. Cl.
*H04L 29/06* (2006.01)
*H04L 12/851* (2013.01)
*H04L 12/801* (2013.01)

(52) U.S. Cl.
CPC ........ *H04L 63/0236* (2013.01); *H04L 47/2483* (2013.01); *H04L 47/33* (2013.01); *H04L 47/35* (2013.01); *H04L 63/0245* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,570,877 B1* | 5/2003 | Kloth et al. | 370/392 |
| 7,376,125 B1* | 5/2008 | Hussain et al. | 370/352 |
| 2003/0086415 A1 | 5/2003 | Bernhard et al. | |
| 2003/0105976 A1 | 6/2003 | Copeland, III | |
| 2004/0049596 A1* | 3/2004 | Schuehler et al. | 709/238 |
| 2004/0250059 A1 | 12/2004 | Ramelson et al. | |
| 2008/0047008 A1 | 2/2008 | Cho et al. | |
| 2008/0189784 A1 | 8/2008 | Mangione-Smith et al. | |
| 2011/0149736 A1* | 6/2011 | Kashyap et al. | 370/235 |

OTHER PUBLICATIONS

International Search Report and Written Opinion mailed Jul. 18, 2013, directed to International Application No. PCT/US2013/041318; 11 pages.

Sommers et al. (Apr. 15, 2011) "Efficient Network-wide Flow Record Generation," located at <http://cs-people.bu.edu/eriksson/papers/erikssonInfocom11Flow.pdf> visited on Jul. 1, 2013. (11 pages).

* cited by examiner

*Primary Examiner* — Ashley Shivers
(74) *Attorney, Agent, or Firm* — Morrison & Foerster LLP

(57) ABSTRACT

Systems and processes for filtering network traffic. In one example, an event based flow record aging process may be used to identify flow records to be removed from memory to provide space for newer flow records. In this example, a new incoming network packet may trigger a determination of the flow record to be removed from memory based on the hardware time stamps of the flow records stored in memory. Determining aging flow records in this way may advantageously reduce the amount of computer resources required to manage flow record aging when compared to traditional techniques that require keeping a timer and periodically performing a cleanup process to check the freshness date of each flow record.

20 Claims, 3 Drawing Sheets

PACKET CAPTURE DEEP PACKET INSPECTION SENSOR

CROSS-REFERENCE TO RELATED APPLICATIONS

This application claims priority to U.S. Provisional Patent Application Ser. No. 61/647,689, filed May 16, 2012, the entire disclosure of which is hereby incorporated by reference in its entirety for all purposes as if put forth in full below.

BACKGROUND

1. Field

This disclosure relates generally to computer network security and, more specifically, to filtering network traffic into a secured network.

2. Discussion of the Related Art

While the Internet has allowed computer users to easily access large volumes of information from all over the world, it has also made computers that are universally linked to the Internet vulnerable to hacking or unauthorized access to the users' computers and their stored data. For example, Internet-connected computers are vulnerable to online theft of credit card numbers, personal information theft, hijacking of websites, and malicious viruses, Trojans, worms, and other malicious programming that either steals the user's data, misdirects other users from intended websites, or destroys data and installed software. Such unauthorized access to computer data and systems is illegal in the U.S. and in most countries. The offenders, however, are usually located offshore and only the most egregious violations that involve national security or large sums of money are pursued by law enforcement officials. Additionally, the offenders are becoming increasingly savvy in overcoming security measures that are being put in place, making the cost of protecting networks more of a burden on businesses and government agencies that are increasingly reliant on network systems to accomplish their goals. Increasing reliance on networks of servers and computers, sometimes linking thousands of users over several continents within one organization, makes intrusions of those networks even more insidious. It is therefore a requirement that users protect their own systems and networks with even more sophistication than the tools used by hackers.

Networks owned by governments and institutions handling large amounts of credit card transactions are heavily targeted by hackers for various reasons. Hardware and software designed to act as a "firewall" to prevent users outside a network from illegally accessing a network, along with other measures, such as antivirus software, antispyware programs, and password protected compartmentalization of systems, are often defeated by highly experienced hackers with the time and the will to intrude on a computer system. Usually, the user is not aware of an intrusion onto their systems, with stealthy online criminals stealing sensitive data, launching denial of service attacks, and using the email addresses of hacked systems to send spam and unwanted emails to unsuspecting contacts of the infected users. Government agencies tasked with national security missions and the contractors with whom they work have networks that are often targeted with malicious intent by entities wishing to disrupt the systems for political reasons or in association with hostilities or terrorist activities directed against the targeted governments.

Traditional network security measures include, in the most basic form, authentication of authorized users requiring the use of usernames and passwords to enter the system. Additional security measures can also include a key card, biometrics, such as iris scans or finger prints, or additional personalized information, known as a "security question." While these measures help to prevent unauthorized users from accessing the system, they do not prevent access to the network through emails, instant messaging, or other network-based intrusions.

Currently, filtering of data from the Internet requires maintaining flow records that track incoming network traffic. Due to limited computing resources, the memory used to store flow records needs to be maintained by keeping a timer and periodically executing a cleanup process to evaluate every flow record to see if the freshness date, or flow age, has expired. Executing this cleanup process is computationally expensive in memory cycles at very high speeds. Thus, there exists a need to save memory, enhance speed, and reduce storage requirements when filtering Internet traffic into a secure network.

SUMMARY

Various embodiments directed to filtering network traffic are disclosed. One example process may include receiving a network packet; identifying a flow record associated with the received network packet in a flow table; if the identified flow record is flagged for forwarding, transmitting the packet; and if the identified flow record is not flagged for forwarding: determining whether the packet matches a packet profile; if the packet does not match the packet profile, appending the received packet to a list of packets associated with the identified flow record; and if the packet matches the packet profile, transmitting a set of packets on the list of packets associated with the identified flow record and flagging the identified flow record for forwarding.

In one example, identifying a flow record associated with the received network packet may include: generating an index of the received network packet based on a TCP host address of a sender of the received network packet, a TCP host address of a receiver of the received network packet, a TCP/IP port number of the sender of the received network packet, a TCP/IP port number of the receiver of the received network packet, a network protocol of the received network packet, and an addressing of the received network packet; and comparing the generated index to a set of indexes in the flow table.

In one example, the identified flow record may include a forward bit that indicates whether or not the identified flow record is flagged for forwarding.

In one example, determining whether the packet matches a packet profile may include: determining whether the received packet is of a protocol of interest; and determining whether a sender or receiver of the packet is an entity of interest. In one example, the protocol of interest may be associated with one or more of text-based email, text-based chat sessions, POP, SMTP, and instant messaging.

In one example, the process may further include: before receiving the network packet, allocating memory for the flow table; and dividing the allocated memory into a plurality of memory blocks, wherein each of the plurality of memory blocks is for storing an incoming network packet.

In one example, the process may further include comparing, in response to receiving the network packet, a time stamp of the received network packet with a plurality of flow tables, wherein the plurality of flow tables are stored in a random access memory; and removing an oldest flow table of the plurality of flow tables from the memory.

Systems and non-transitory computer-readable storage media for filtering network traffic are also disclosed.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to filtering network traffic. In one example, an event based flow record aging process may be used to identify flow records to be removed from memory to provide space for newer flow records. In this example, a new incoming network packet may trigger a determination of the flow record to be removed from memory based on the hardware time stamps of the flow records stored in memory. Determining aging flow records in this way may advantageously reduce the amount of computer resources required to manage flow record aging when compared to traditional techniques that require keeping a timer and periodically performing a cleanup process to check the freshness date of each flow record.

Figure 1:
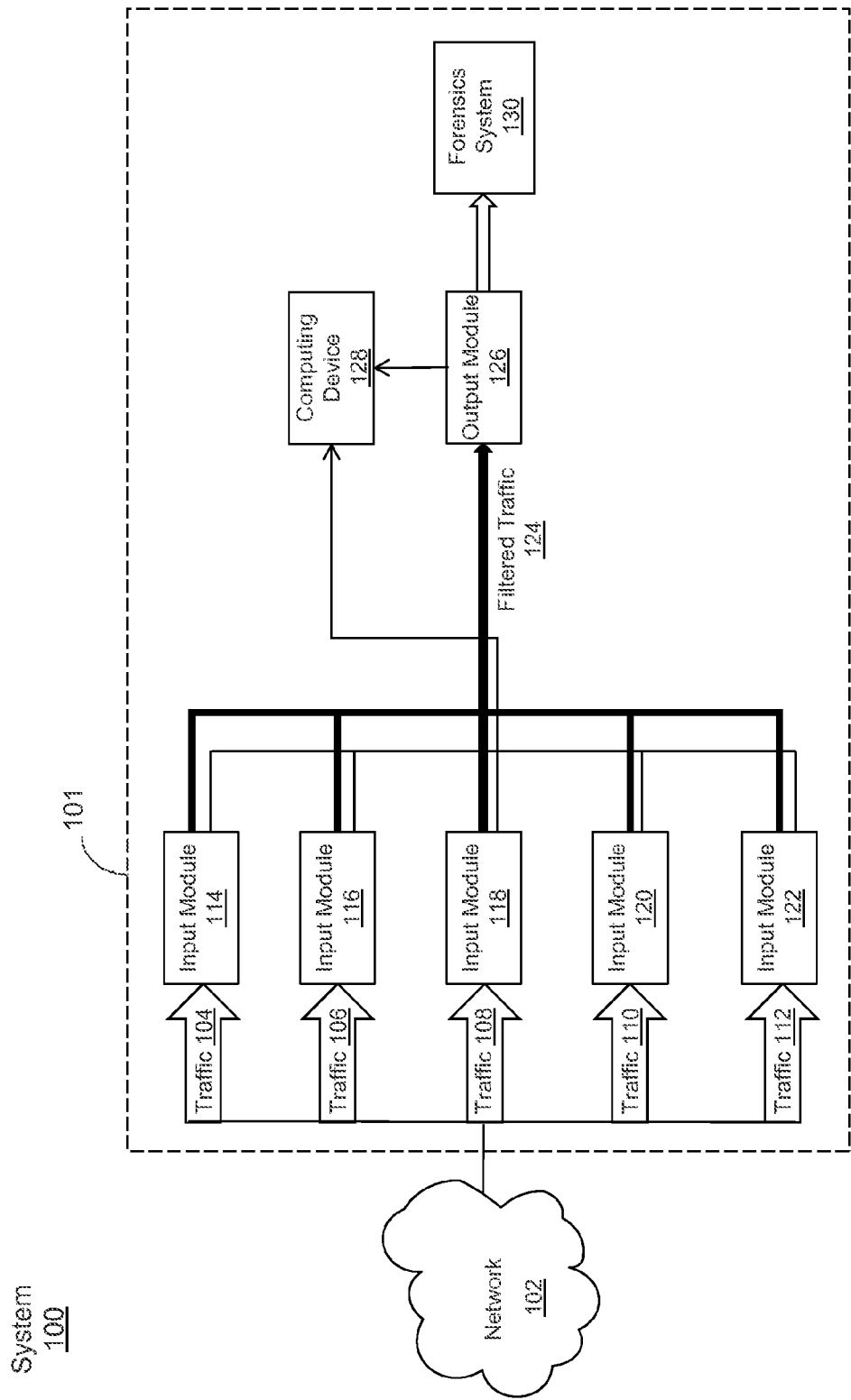
FIG. 1 is a block diagram illustrating an example system for filtering network traffic according to various examples.

FIG. 1 is a block diagram illustrating an example system 100 for filtering network traffic according to various examples. System 100 may generally include a first network 101, which may include a local area network ("LAN") or another public or private network, coupled to a second network 102, which may include the Internet or another public or private network. Data may be provided to network 101 via network 102 as unfiltered network traffic.

Network 101 may include a hardware interface to sort the incoming unfiltered traffic according to a hash load balancing algorithm into separate bins, also known as "hash bins," "receive streams," or "receive threads." In the example illustrated in FIG. 1, a forensic capture card may implement a 5-way hash load balancing algorithm to sort the incoming traffic into five separate streams of unfiltered traffic 104, 106, 108, 110, and 112. The forensic capture card may be plugged into a slot on a computer, also known as host adapter, and may be configured to receive all traffic on a LAN. This is in contrast to a standard network interface card, also known as a network host adapter, which may only receive traffic that is destined for a particular machine. Thus, a forensic capture card may receive all traffic on network 101, even traffic that includes conversations or flows between other machines on the computer's own network. The forensic capture card may be further configured to split the traffic in such a way that it may be digested by multiple cores of a microprocessor and to allow a receiving program to be multi-threaded to work on the network traffic in parallel.

The streams of unfiltered traffic 104, 106, 108, 110, and 112 may be provided to input modules 114, 116, 118, 120, and 122, respectively. The input modules may include a computing device configured to filter the incoming unfiltered traffic, as described below with respect to FIG. 2. Input modules 114, 116, 118, 120, and 122 may be coupled to provide filtered traffic 124 to output module 126, which may include a computing device configured to identify network traffic to be evaluated by forensics system 130. Status information, represented by the un-bolded lines in FIG. 1, may be provided to computing device 128 by input modules 114, 116, 118, 120, and 122 and output module 126. Computing device 128 may be used to provide a graphical user interface showing the received status information to a user.

Network 101 may further include forensics system 130 coupled to receive the network traffic output of output module 126. Forensics system 130 may be configured to perform network monitoring and forensics analysis and may include any forensics system known to those of ordinary skill in the art.

Figure 2:
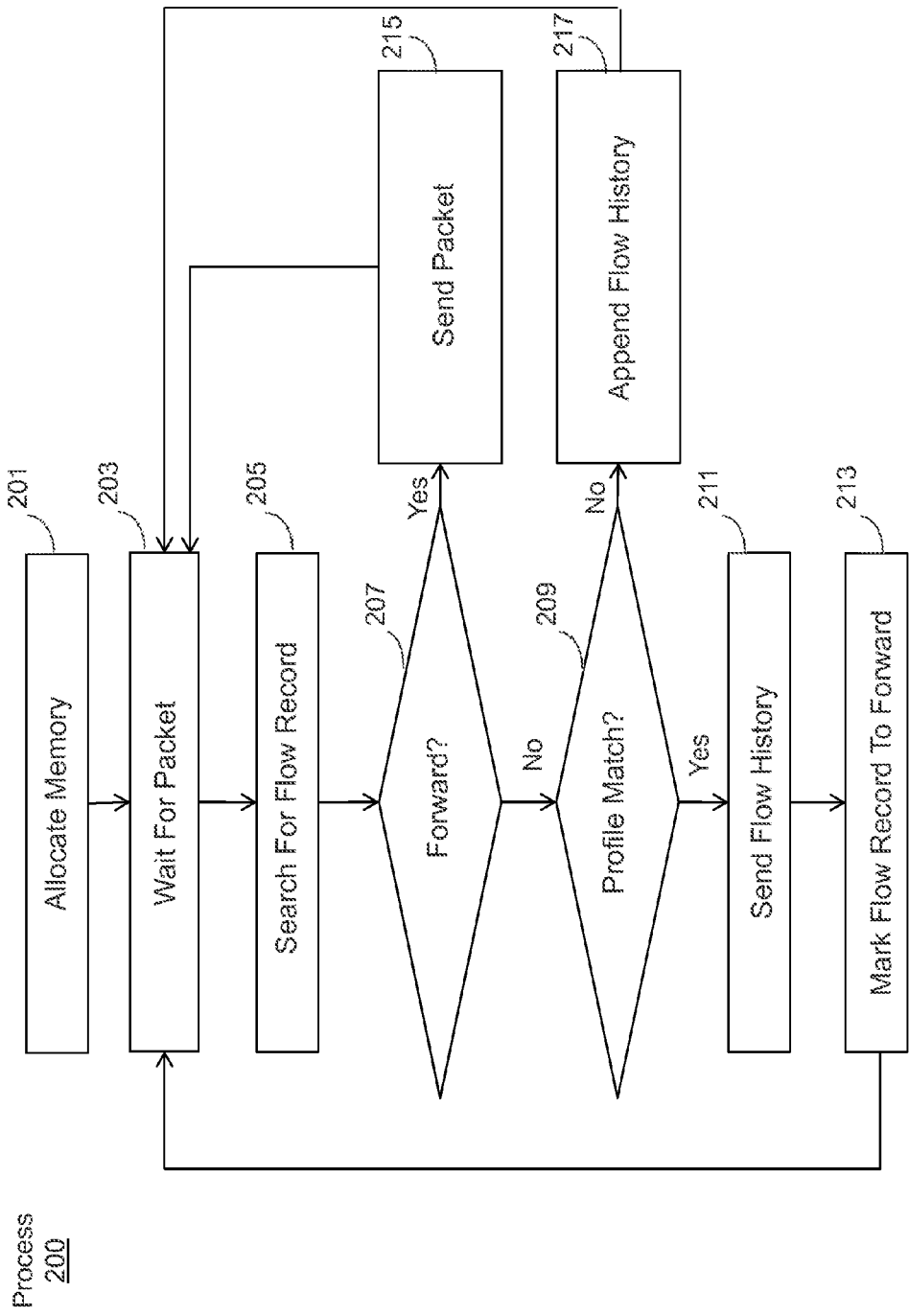
FIG. 2 illustrates an example process for filtering network traffic according to various examples.

FIG. 2 illustrates an example process 200 for filtering network traffic. Process 200 may be performed by input modules 114, 116, 118, 120, and 122 of system 100. At block 201, space in random access memory ("RAM") may be allocated for packets of the incoming unfiltered network traffic. The packets may be stored in one or more flow tables built in RAM to allow for faster searching. The flow tables may store identifiers for conversations or flows between two network components, which may be treated as separate and distinct entities and may also be referred to as a session.

In some examples, a flow may be uniquely described using the address of the initiator (source address), the address of the target (destination address), the network ports being used (source port and destination port), the protocol being used (TCP vs UDP) and the addressing scheme (IPv4 vs IPv6). These 6 items may form an ordered list, which in mathematical terms are referred to as tuples. In particular, the 6-tuples may be combined into one number having 98 bits of information. Specifically, one bit may be used track TCP vs. UDP, one bit may be used to track IPv4 vs. IPv6, 32 bits may be used to represent the source IP address, 32 bits may be used to represent the destination IP address, 16 bits may be used to represent the source port, and 16 bits may be used to represent the destination port. In some examples, a mathematical hashing algorithm called a "6-tuple hash" may be used to convert the 6-tuple 98-bit number to a single 32-bit number. The hash may be unique for each flow and may be stored in the flow table in RAM, which may be indexed to allow for very fast retrieval of the information.

To pre-allocate memory for the flow tables at block 201, a large amount of memory may be set aside during initialization in order to provide fast flow table entry access. In contrast, in a traditional system, the memory for the flow entries may be allocated by a system call when each packet arrives to reserve the memory, also known as memory allocation ("IE malloc"). This traditional approach may reduce the rate at which flow entries can be added due to the processing expense of the system calls. Thus, at block 201, individual memory allocation calls may not be performed and instead a large amount of memory (e.g., ½ billion bytes) may be allocated and divided into smaller blocks (e.g., of about 1632 bytes) such that when a packet is received, a place for it has already been prepared in memory. This may advantageously allow the system to sustain a flow creation rate of, for example, ½ million flows per second. While specific values are provided above, it should be appreciated that other values may be used depending on the desired system characteristics.

Since smaller blocks of memory have been designated for incoming packets, memory allocation can be performed in one clock cycle because the system need only add a relatively small amount (e.g., 1632) to the current point in the block flow creation rate equal to or greater than ⅛th of the receive packet-per-second ("PPS") rate. Thus, for example, on a 10 GB network, the maximum PPS on a single link may be 14.5 million PPS (representing the number of packets that are received by a system over a network link in a single second). The flow creation rate in this system may be 1.825 million bytes per second. Since flows may be made up of multiple packets, the flow creation rate may be less than the number of PPS. The example range provided herein is expressed as a percent of PPS because while the PPS may increase as a system gets faster, the memories and processors may also become faster. Thus, for example, on a 40 GB network connection, there may be a maximum PPS of 58 million, or a maximum flow creation rate of 7.25 million flows per second.

Since the memory set aside at block 201 may be limited, flow record aging may be performed to keep from running out of memory by creating a sliding buffer of packets that constitute a pre-history buffer. This sliding window may remove older packets from memory to make room for the new packets. Thus, flow aging may be performed to discard conversations or flows that have not been active and keeping the conversations or flows that are active.

To perform flow aging, the system may wait for a new packet to arrive at block 203. In response to receiving the new packet, the system may use the hardware time stamps to determine the ages of the stored flows. The oldest identified entry may be removed from memory if additional space is needed to store the flow record for the new packet. This is in contrast to traditional systems that check each flow record to determine if the freshness date, or flow age has expired. This traditional technique is a computationally expensive operation. Thus, waiting for a new packet to arrive at block 203 before performing flow aging advantageously reduces the processing resources required to perform flow aging when compared to traditional techniques.

Referring to FIG. 1, each input module 114, 116, 118, 120, and 122 may wait for a packet to be received from unfiltered traffic 104, 106, 108, 110, and 122, respectively, at block 203. Once a packet is received and stored in system memory, the packet may be checked to see that it is a TCP-type packet since the indexing may specify that the packets be at least at network level 3 (referring to network level 3 of the Open Systems Interconnection ("OSI") model of network interfaces). One such popular network interface in use is TCP. Most current "level 3" is TCP/IP and in common trade parlance, "network level" is often synonymous with TCP.

Once the packet is received and verified as a valid TCP packet at block 203, the process may proceed to block 205. At block 205, the flow table(s) generated at block 201 may be searched for a flow record associated with the packet received at block 203. To perform the search, an index may be generated using the following fields within the packet: (1) sender's TCP host address; (2) receiver's TCP host address; (3) sender's TCP/IP port number; (4) receiver's TCP/IP port number; (5) the fact that the conversation is either UDP or TCP; and (6) whether addressing is IPv4 or IPv6. This index may be generated in a similar manner as described above with respect to block 201. Indexing flow records using both the identity of the sender and the receiver advantageously creates a single flow index for each conversation. Traditional systems generate two flow indexes, one for each side of the conversation. As a result, traditional systems require two searches of the flow table, one for each index. By using a single flow index, only a single search of the flow record need be performed, thereby doubling the rate of flow look ups that can be achieved. Doubling the rate of flow look ups also doubles overall system performance.

Once the flow record reflecting both sides of the flow is identified from the flow table(s) using the generated index at block 205, the process may proceed to block 207. At block 207, the flow can be tracked using the flow record. At this point, it may be determined whether or not the tracked flow has its forward bit set in the flow record. If the forward bit is set, the process may proceed to block 215 where the packet may be forwarded (e.g., transmitted) to a collection directory and appended to a collection file. The process may then return to block 203. If, however, the forward bit is not set, then the process may proceed to block 209.

At block 209, a packet profile match may be performed. This may be performed by first determining whether the received packet is of a protocol of interest. For example, the requested TCP/IP port number may be analyzed to see if it is a protocol of interest, such as a protocol associated with one of the following types: (1) text base email; (2) text based chat sessions; (3) POP; (4) SMTP; or (5) Instant messaging ("IM"). In other examples, the protocol of the received packet may be compared to other sets of protocol types. If it is determined that the TCP/IP protocol is of interest, a check may be performed on the sender and receiver of the message to determine whether either of these individuals is a direct match in an entity of interest database. The entities in this database may include any person or entity whose communications are to be monitored. If the sender or receiver of the message matches a person of interest, a packet profile match may be identified and referenced as a "hit." If the packet profile match is identified, the process may proceed to block 211.

At block 211, the packets in a flow pre-history table may be transmitted in the original order in which they were received. Once transmitted, the process may proceed to block 213. At block 213, the forward bit of the flow record identified at block 205 may be set, thereby causing subsequent packets that match the flow to be transmitted at blocks 207 and 215. The process may then return to block 203.

If, however, it was determined at block 209 that no packet profile was identified, the process may proceed from block 209 to block 217. At block 217, the packet may be appended to a list of packets associated with its associated flow record determined at block 205. This list may also be referred to as the flow pre-history, which stores the packets in every conversation it sees prior to the flow getting a hit at block 209. In this way the system can recall all of the information in the flow prior to the "hit" or match of a person of interest. This flow pre-history advantageously allows the system to return to the beginning of a conversation after detecting a hit. This advantageously allows the entire flow or conversation to be reconstructed from the start, even when only a portion of the flow (e.g., one or two words) was detected. Once the packet is appended to the flow pre-history table, the process may return to block 203.

In one example, the flow pre-history may be stored on a fast SSD disk such that it can be quickly accessed to append packets and remove packets at line rate. It may also be associated with a six-tuple flow of information within ¼ of a packet time. For an example flow pre-history in a 10 GB network, the flow pre-history system may be required to do the following within a packet time (1/14.5 millionth, or 68 nsec): 1) discern which flow the new packet should be associated with and 2) append the new packet to the current flow when receiving or remove from the current flow when transmitting. In this example, if the system is unable accomplish these operations in 68 nsec or less, then the system may run out of memory and stop.

Figure 3:
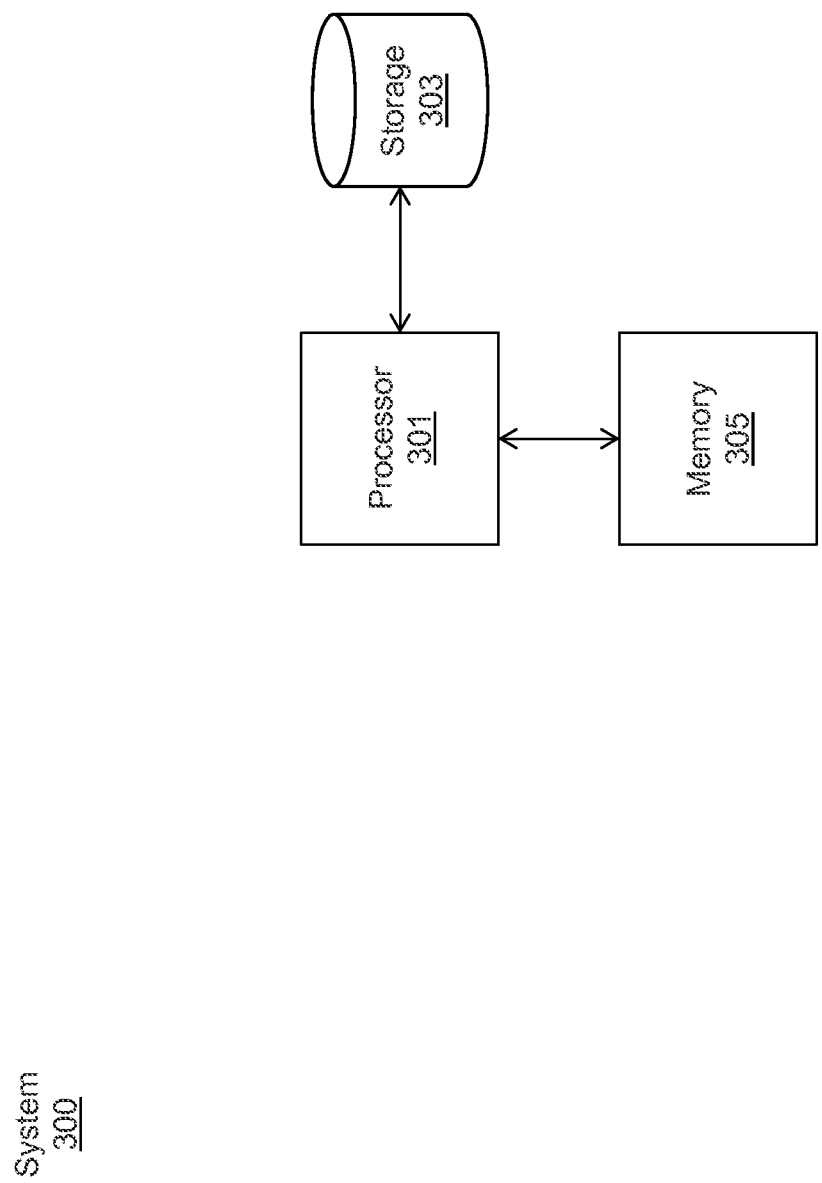
FIG. 3 illustrates an example computing system.

FIG. 3 illustrates a block diagram of an example computing system 300 for filtering network traffic according to various examples. System 300 may be included within network 101 and may include a processor 301 for performing some or all of process 300, described above. Processor 301 may be coupled to storage 303, which may include a hard-disk drive or other large capacity storage device. In some examples, persons of interest may be stored in storage 303. System 300 may further include memory 305, such as a random access memory. In some examples, the flow table and/or the pre-history table may be stored in at least a portion of memory 305.

In some examples, a non-transitory computer-readable storage medium can be used to store (e.g., tangibly embody) one or more computer programs for performing any one of the above-described processes by means of a computer. The computer program may be written, for example, in a general purpose programming language (e.g., Pascal, C, C++) or some specialized application-specific language. The non-transitory computer-readable medium may include storage 303, memory 305, embedded memory within processor 301, an external storage device (not shown), or the like.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A computer-implemented method for filtering network traffic, the method comprising:
    receiving a network packet;
    identifying a flow record associated with the received network packet in a flow table;
    if the identified flow record is flagged for forwarding, transmitting the packet; and
    if the identified flow record is not flagged for forwarding:
        determining whether the packet matches a packet profile;
        if the packet does not match the packet profile, appending the received packet to a list of packets associated with the identified flow record; and
        if the packet matches the packet profile, transmitting a set of packets on the list of packets associated with the identified flow record and flagging the identified flow record for forwarding.

2. The computer-implemented method of claim 1, wherein identifying a flow record associated with the received network packet comprises:
    generating an index of the received network packet based on a TCP host address of a sender of the received network packet, a TCP host address of a receiver of the received network packet, a TCP/IP port number of the sender of the received network packet, a TCP/IP port number of the receiver of the received network packet, a network protocol of the received network packet, and an addressing of the received network packet; and
    comparing the generated index to a set of indexes in the flow table.

3. The computer-implemented method of claim 1, wherein the identified flow record comprises a forward bit that indicates whether or not the identified flow record is flagged for forwarding.

4. The computer-implemented method of claim 1, wherein determining whether the packet matches a packet profile comprises:
    determining whether the received packet is of a protocol of interest; and
    determining whether a sender or receiver of the packet is an entity of interest.

5. The computer-implemented method of claim 4, wherein the protocol of interest is associated with one or more of text-based email, text-based chat sessions, POP, SMTP, and instant messaging.

6. The computer-implemented method of claim 1, further comprising, before receiving the network packet:
    allocating memory for the flow table; and
    dividing the allocated memory into a plurality of memory blocks, wherein each of the plurality of memory blocks is for storing an incoming network packet.

7. The computer-implemented method of claim 1, wherein the method further comprises:
    comparing, in response to receiving the network packet, a time stamp of the received network packet with a plurality of flow tables, wherein the plurality of flow tables are stored in a random access memory; and
    removing an oldest flow table of the plurality of flow tables from the memory.

8. A non-transitory computer-readable storage medium for filtering network traffic, wherein the non-transitory computer-readable storage medium comprises instructions for:
    receiving a network packet;
    identifying a flow record associated with the received network packet in a flow table;
    if the identified flow record is flagged for forwarding, transmitting the packet; and
    if the identified flow record is not flagged for forwarding:
        determining whether the packet matches a packet profile;
        if the packet does not match the packet profile, appending the received packet to a list of packets associated with the identified flow record; and
        if the packet matches the packet profile, transmitting a set of packets on the list of packets associated with the identified flow record and flagging the identified flow record for forwarding.

9. The non-transitory computer-readable storage medium of claim 8, wherein identifying a flow record associated with the received network packet comprises:
    generating an index of the received network packet based on a TCP host address of a sender of the received network packet, a TCP host address of a receiver of the received network packet, a TCP/IP port number of the sender of the received network packet, a TCP/IP port number of the receiver of the received network packet, a network protocol of the received network packet, and an addressing of the received network packet; and
    comparing the generated index to a set of indexes in the flow table.

10. The non-transitory computer-readable storage medium of claim 8, wherein the identified flow record comprises a forward bit that indicates whether or not the identified flow record is flagged for forwarding.

11. The non-transitory computer-readable storage medium of claim 8, wherein determining whether the packet matches a packet profile comprises:

determining whether the received packet is of a protocol of interest; and determining whether a sender or receiver of the packet is an entity of interest.

12. The non-transitory computer-readable storage medium of claim 11, wherein the protocol of interest is associated with one or more of text-based email, text-based chat sessions, POP, SMTP, and instant messaging.

13. The non-transitory computer-readable storage medium of claim 8, further comprising instructions for:

before receiving the network packet, allocating memory for the flow table; and dividing the allocated memory into a plurality of memory blocks, wherein each of the plurality of memory blocks is for storing an incoming network packet.

14. The non-transitory computer-readable storage medium of claim 8, further comprising instructions for:

comparing, in response to receiving the network packet, a time stamp of the received network packet with a plurality of flow tables, wherein the plurality of flow tables are stored in a random access memory; and removing an oldest flow table of the plurality of flow tables from the memory.

15. A system for filtering network traffic, the system comprising:

a non-transitory computer-readable storage medium comprising instructions for:

receiving a network packet;

identifying a flow record associated with the received network packet in a flow table;

if the identified flow record is flagged for forwarding, transmitting the packet; and if the identified flow record is not flagged for forwarding:

determining whether the packet matches a packet profile;

if the packet does not match the packet profile, appending the received packet to a list of packets associated with the identified flow record; and if the packet matches the packet profile, transmitting a set of packets on the list of packets associated with the identified flow record and flagging the identified flow record for forwarding; and a processor coupled to the non-transitory computer-readable storage medium and configured to execute the instructions.

16. The system of claim 15, wherein identifying a flow record associated with the received network packet comprises:

generating an index of the received network packet based on a TCP host address of a sender of the received network packet, a TCP host address of a receiver of the received network packet, a TCP/IP port number of the sender of the received network packet, a TCP/IP port number of the receiver of the received network packet, a network protocol of the received network packet, and an addressing of the received network packet; and comparing the generated index to a set of indexes in the flow table.

17. The system of claim 15, wherein the identified flow record comprises a forward bit that indicates whether or not the identified flow record is flagged for forwarding.

18. The system of claim 15, wherein determining whether the packet matches a packet profile comprises:

determining whether the received packet is of a protocol of interest; and determining whether a sender or receiver of the packet is an entity of interest.

19. The system of claim 15, wherein the non-transitory computer-readable storage medium further comprises instructions for:

before receiving the network packet, allocating memory for the flow table; and dividing the allocated memory into a plurality of memory blocks, wherein each of the plurality of memory blocks is for storing an incoming network packet.

20. The system of claim 15, wherein the non-transitory computer-readable storage medium further comprises instructions for:

comparing, in response to receiving the network packet, a time stamp of the received network packet with a plurality of flow tables, wherein the plurality of flow tables are stored in a random access memory; and removing an oldest flow table of the plurality of flow tables from the memory.

* * * * *